(12) United States Patent
Wang et al.

(10) Patent No.: US 11,541,881 B2
(45) Date of Patent: Jan. 3, 2023

(54) AUTOMATIC PARKING METHOD, DEVICE, SYSTEM, AND VEHICLE

(71) Applicant: BYD COMPANY LIMITED, Shenzhen (CN)

(72) Inventors: Yuxin Wang, Shenzhen (CN); Junming Bai, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 5 days.

(21) Appl. No.: 17/256,907

(22) PCT Filed: Jun. 19, 2019

(86) PCT No.: PCT/CN2019/091942
§ 371 (c)(1),
(2) Date: Dec. 29, 2020

(87) PCT Pub. No.: WO2020/001347
PCT Pub. Date: Jan. 2, 2020

(65) Prior Publication Data
US 2021/0276543 A1    Sep. 9, 2021

(30) Foreign Application Priority Data
Jun. 29, 2018  (CN) .......................... 201810714751.8

(51) Int. Cl.
*H04N 5/44*     (2011.01)
*B60W 30/06*    (2006.01)
(Continued)

(52) U.S. Cl.
CPC ............ *B60W 30/06* (2013.01); *B60W 30/09* (2013.01); *G06T 5/002* (2013.01); *G06V 20/58* (2022.01);
(Continued)

(58) Field of Classification Search
CPC ...... B60W 30/06; B60W 10/18; B60W 50/14; B60W 2050/146; G06K 9/00805; G06K 9/00812; G08G 1/168
See application file for complete search history.

(56) References Cited

U.S. PATENT DOCUMENTS 8,384,561 B2    2/2013  Kadowaki et al.
2004/0130464 A1 7/2004  Schindler et al.
(Continued)

FOREIGN PATENT DOCUMENTS

CN    102267461 A    12/2011
CN    102725180 A    10/2012
(Continued)

OTHER PUBLICATIONS

The World Intellectual Property Organization (WIPO) International Search Report for PCT/CN2019/091942 dated Aug. 26, 2019 6 Pages.

*Primary Examiner* — Munear T Akki
(74) *Attorney, Agent, or Firm* — Anova Law Group, PLLC

(57) ABSTRACT

An automatic parking method includes: acquiring a panoramic image near a vehicle, and recognizing a parking space line in the panoramic image; determining whether a parking space exists near the vehicle according to a recognition result; in response to the recognition result indicating that no parking space exists near the vehicle, generating a virtual parking space; and controlling the vehicle to park automatically according to the virtual parking space.

10 Claims, 6 Drawing Sheets

(51) Int. Cl.
   *B60W 30/09* (2012.01)
   *G06T 5/00* (2006.01)
   *G06V 20/58* (2022.01)
   *G06V 20/56* (2022.01)
(52) U.S. Cl.
   CPC .......... *G06V 20/586* (2022.01); *G06V 20/588* (2022.01)

(56) References Cited

U.S. PATENT DOCUMENTS

| | | | | |
|---|---|---|---|---|
| 2014/0163862 A1* | 6/2014 | Choi | .................... | B62D 15/028 701/400 |
| 2016/0005316 A1* | 1/2016 | Lee | .................... | G06V 20/586 348/38 |
| 2016/0313731 A1* | 10/2016 | Leppänen et al. | ..... | B60K 35/00 |
| 2017/0206786 A1* | 7/2017 | Dhondse | ................ | G08G 1/143 |
| 2018/0099661 A1* | 4/2018 | Bae | .................... | B62D 15/0285 |
| 2018/0130351 A1* | 5/2018 | Ha | ........................ | G06Q 10/02 |
| 2018/0178840 A1 | 6/2018 | Hung et al. | | |
| 2020/0117927 A1* | 4/2020 | Oba | .......................... | G06T 7/00 |
| 2020/0118310 A1* | 4/2020 | Matsumoto | ........ | B62D 15/0295 |
| 2020/0380713 A1* | 12/2020 | Choi | ........................ | G06T 7/70 |

FOREIGN PATENT DOCUMENTS

| | | |
|---|---|---|
| CN | 102910166 A | 2/2013 |
| CN | 103158701 A | 6/2013 |
| CN | 103754219 A | 4/2014 |
| CN | 104723991 A | 6/2015 |
| CN | 107585159 A | 1/2018 |
| CN | 107719361 A | 2/2018 |
| CN | 107730878 A | 2/2018 |
| CN | 107738612 A | 2/2018 |
| CN | 108275143 A | 7/2018 |

* cited by examiner

AUTOMATIC PARKING METHOD, DEVICE, SYSTEM, AND VEHICLE

CROSS-REFERENCE TO RELATED APPLICATIONS

This application is a national phase entry under 35 U.S.C. § 371 of International Application No. PCT/CN2019/091942, filed on Jun. 19, 2019, which claims priority to Chinese Patent Application No 201810714751.8 filed by the BYD Co., Ltd. on Jun. 29, 2018, and entitled AUTOMATIC PARKING METHOD, APPARATUS AND SYSTEM, AND VEHICLE, the entire content of all of which is incorporated herein by reference in its entirety.

FIELD

The present disclosure relates to the technical field of vehicle parking technologies, and in particular, to an automatic parking method, device, system, and a vehicle.

BACKGROUND

In the related art, the methods for implementing automatic parking technologies include using ultrasonic radars to detect the distance between a moving vehicle and obstacle vehicles on parking spaces, to determine whether an empty parking space exists between the obstacle vehicles, or, using a panoramic image to detect whether a parking space line exists, to detect and confirm the parking space, thereby implementing automatic parking.

However, the aforementioned automatic parking methods have certain limitations: parking spaces cannot be recognized accurately when there are a great number of empty parking spaces in a parking lot, in the case of angle parking spaces, or when the light intensity of the parking lot is low. At this point, the automatic parking cannot be implemented quickly and efficiently, which greatly reduces the efficiency of automatic parking.

SUMMARY

An objective of the present disclosure is to at least resolve one of the technical problems in the related art to some extent. In view of this, a first objective of the present disclosure is to provide an automatic parking method, in which a virtual parking space can be generated to assist a vehicle to implement automatic parking when no parking space exists near the vehicle, to implement automatic parking in an efficient, flexible, and safe way.

A second objective of the present disclosure is to provide an automatic parking device.

A third objective of the present disclosure is to provide an automatic parking system.

A fourth objective of the present disclosure is to provide a vehicle.

To achieve the above objectives, in a first aspect, an embodiment of the present disclosure provides an automatic parking method, including the following steps: acquiring a panoramic image near a vehicle, and recognizing a parking space line in the panoramic image; determining whether a parking space exists near the vehicle according to a recognition result; if the recognition result is no, generating a virtual parking space; and controlling the vehicle to park automatically according to the virtual parking space.

In the automatic parking method according to the embodiments of the present disclosure, a panoramic image is acquired near a vehicle, and a parking space line is recognized in the panoramic image; whether a parking space exists near the vehicle is determined according to a recognition result; if the recognition result is no, a virtual parking space is generated; and the vehicle is controlled to park automatically according to the virtual parking space. In this way, a virtual parking space can be generated to assist the vehicle to implement automatic parking when no parking space exists near the vehicle, to implement automatic parking in an efficient, flexible, and safe way.

According to an embodiment of the present disclosure, the automatic parking method further includes adjusting the virtual parking space according to an adjustment instruction of the virtual parking space input by a user and controlling the vehicle to park automatically according to the adjusted virtual parking space.

According to an embodiment of the present disclosure, the controlling the vehicle to park automatically according to the adjusted virtual parking space includes: acquiring first actual physical position coordinates of the adjusted virtual parking space on the ground; planning an automatic parking trajectory according to the first actual physical position coordinates; and controlling the vehicle to park automatically along the automatic parking trajectory according to the automatic parking trajectory.

According to an embodiment of the present disclosure, the adjusting the virtual parking space according to an adjustment instruction of the virtual parking space input by a user includes: adjusting a size of the virtual parking space according to a size adjustment instruction of the virtual parking space input by the user; and/or, adjusting an angle of the virtual parking space according to an angle adjustment instruction of the virtual parking space input by the user; and/or, adjusting a position of the virtual parking space according to a position adjustment instruction of the virtual parking space input by the user.

According to an embodiment of the present disclosure, the determining whether a parking space exists near the vehicle according to a recognition result includes: if a probable parking space line is recognized, and a pixel value of the probable parking space line is greater than or equal to a set pixel value threshold, determining that the parking space exists near the vehicle; or, if a probable parking space line is recognized, but a pixel value of the probable parking space line is smaller than a set pixel value threshold, or a probable parking space line is not recognized, determining that no parking space exists near the vehicle.

According to an embodiment of the present disclosure, the automatic parking method further includes: extracting a valid parking space line from the probable parking space line according to a preset parking space feature line if the parking space exists near the vehicle; generating a plurality of valid virtual parking spaces according to the valid parking space line, the valid virtual parking spaces being in one-to-one correspondence with real parking spaces corresponding to the valid parking space line; selecting a target valid virtual parking space from the plurality of valid virtual parking spaces according to a selection instruction from the plurality of valid virtual parking spaces input by the user; and controlling the vehicle to park automatically according to the target valid virtual parking space.

According to an embodiment of the present disclosure, the extracting a valid parking space line from the probable parking space line according to a preset parking space feature line includes matching the probable parking space line against the preset parking space feature line and using the probable parking space line matching the preset parking space feature line as the valid parking space line.

According to an embodiment of the present disclosure, the controlling the vehicle to park automatically according to the target valid virtual parking space includes: acquiring second actual physical position coordinates of the target valid virtual parking space on the ground; planning an automatic parking trajectory according to the second actual physical position coordinates; and controlling the vehicle to park automatically along the automatic parking trajectory according to the automatic parking trajectory.

According to an embodiment of the present disclosure, the automatic parking method further includes: detecting whether there is an obstacle on the automatic parking trajectory; if there is an obstacle on the automatic parking trajectory, controlling the vehicle to slow down and stop, and re-planning the automatic parking trajectory; and controlling, according to the re-planned automatic parking trajectory, the vehicle to park automatically along the re-planned automatic parking trajectory.

According to an embodiment of the present disclosure, the acquiring a panoramic image near a vehicle includes acquiring a plurality of images in different directions near the vehicle and preprocessing the plurality of images to obtain the panoramic image.

According to an embodiment of the present disclosure, the preprocessing the plurality of images includes performing any one of or a combination of the following processes on the plurality of images: noise removal, cutting, splicing, smoothing, and calibration and distortion correction.

To achieve the above objectives, in a second aspect, an embodiment of the present disclosure provides an automatic parking device, including an acquisition module configured to acquire a panoramic image near a vehicle and recognize a parking space line in the panoramic image, a determining module configured to determine whether a parking space exists near the vehicle according to a recognition result, a first generating module configured to generate a virtual parking space if no parking space exists near the vehicle, and a first parking module configured to control the vehicle to park automatically according to the virtual parking space.

In the automatic parking device according to the embodiments of the present disclosure, the acquisition module acquires a panoramic image near a vehicle, and recognizes a parking space line in the panoramic image. The determining module determines whether a parking space exists near the vehicle according to a recognition result. The first generating module generates a virtual parking space if no parking space exists near the vehicle. The first parking module controls the vehicle to park automatically according to the virtual parking space. In this way, a virtual parking space can be generated to assist the vehicle to implement automatic parking when no parking space exists near the vehicle, to implement automatic parking in an efficient, flexible, and safe way.

According to an embodiment of the present disclosure, the automatic parking device further includes an adjustment module configured to adjust the virtual parking space according to an adjustment instruction of the virtual parking space input by a user. The first parking module is further configured to: acquire first actual physical position coordinates of the adjusted virtual parking space on the ground; plan an automatic parking trajectory according to the first actual physical position coordinates; and control the vehicle to park automatically along the automatic parking trajectory according to the automatic parking trajectory.

According to an embodiment of the present disclosure, the determining module is specifically configured to: determine that the parking space exists near the vehicle if a probable parking space line is recognized, and a pixel value of the probable parking space line is greater than or equal to a set pixel value threshold; or, determine that no parking space exists near the vehicle if a probable parking space line is recognized, but a pixel value of the probable parking space line is smaller than a set pixel value threshold, or a probable parking space line is not recognized.

According to an embodiment of the present disclosure, the automatic parking device further includes: an extraction module configured to extract a valid parking space line from the probable parking space line according to a preset parking space feature line if the parking space exists near the vehicle; a second generating module configured to generate a plurality of valid virtual parking spaces according to the valid parking space line, the valid virtual parking spaces being in one-to-one correspondence with real parking spaces corresponding to the valid parking space line; a selection module configured to select a target valid virtual parking space from the plurality of valid virtual parking spaces according to a selection instruction from the plurality of valid virtual parking spaces input by the user; and a second parking module configured to: acquire second actual physical position coordinates of the target valid virtual parking space on the ground; plan an automatic parking trajectory according to the second actual physical position coordinates; and control the vehicle to park automatically along the automatic parking trajectory according to the automatic parking trajectory.

According to an embodiment of the present disclosure, the extraction module is specifically configured to: match the probable parking space line against the preset parking space feature line; and use the probable parking space line that matches the preset parking space feature line as the valid parking space line.

According to an embodiment of the present disclosure, the automatic parking device further includes: a detection module configured to detect whether there is an obstacle on the automatic parking trajectory; a planning module configured to control the vehicle to slow down and stop, and re-plan the automatic parking trajectory if there is an obstacle on the automatic parking trajectory; and a third parking module configured to control the vehicle to park automatically along the re-planned automatic parking trajectory according to the re-planned automatic parking trajectory.

To achieve the above objectives, in a third aspect, an embodiment of the present disclosure provides an automatic parking system, including the automatic parking device.

In the automatic parking system according to the embodiments of the present disclosure, the aforementioned automatic parking device is used to generate a virtual parking space to assist a vehicle to implement automatic parking when no parking space exists near the vehicle, to implement automatic parking in an efficient, flexible, and safe way.

To achieve the above objectives, in a fourth aspect, an embodiment of the present disclosure provides a vehicle, including the automatic parking system.

In the vehicle according to the embodiments of the present disclosure, the aforementioned automatic parking system is used to generate a virtual parking space to assist a vehicle to implement automatic parking when no parking space exists near the vehicle, to implement automatic parking in an efficient, flexible, and safe way.

BRIEF DESCRIPTION OF THE DRAWINGS

The accompanying drawings are provided to further understand the present disclosure, and they constitute a part of the specification. The accompanying drawings, along with the specific implementations, are used to explain the present disclosure, and pose no limitation on the present disclosure. In the accompanying drawings.

DETAILED DESCRIPTION

The following describes in detail embodiments of the present disclosure. Examples of the embodiments are shown in the accompanying drawings, where reference signs that are the same or similar from beginning to end represent same or similar components or components that have same or similar functions. The embodiments described below with reference to the accompanying drawings are exemplary and used only for explaining the present disclosure, and should not be construed as a limitation on the present disclosure.

Below an automatic parking method, device, system, and a vehicle provided by the embodiments of the present disclosure are described.

Figure 1:
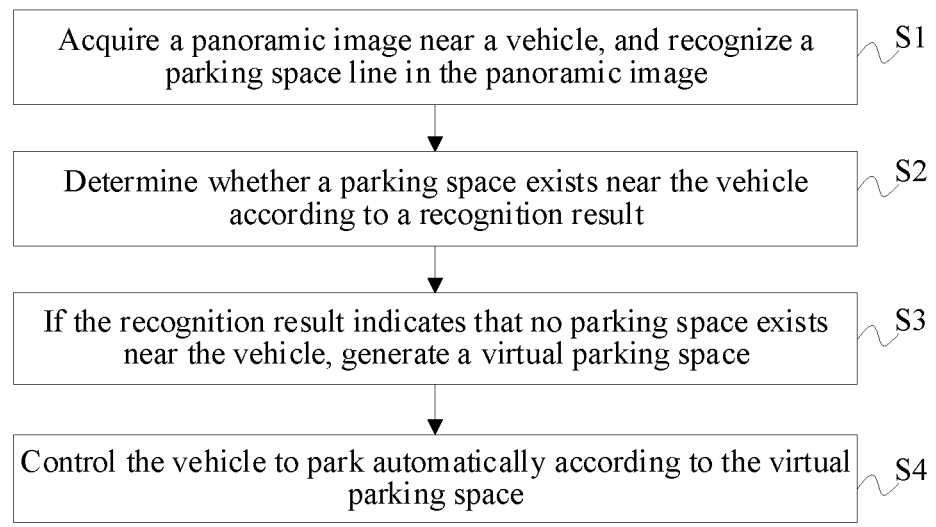
FIG. 1 is a flowchart of an automatic parking method according to an embodiment of the present disclosure.

FIG. 1 is a flowchart of an automatic parking method according to an embodiment of the present disclosure. As shown in FIG. 1, the automatic parking method according to the embodiments of the present disclosure may include the following steps:

S1: Acquiring a panoramic image near a vehicle, and recognizing a parking space line in the panoramic image.

According to an embodiment of the present disclosure, the acquiring a panoramic image near a vehicle may include acquiring a plurality of images in different directions near the vehicle and preprocessing the plurality of images to obtain the panoramic image.

The preprocessing the plurality of images may include performing any one of or a combination of the following processes on the plurality of images: noise removal, cutting, splicing, smoothing, and calibration and distortion correction.

An image perception module may be configured to acquire the panoramic image near the vehicle, and the image perception module may include a front camera, a rear camera, a left camera, and a right camera. The front camera is disposed on the front part of the vehicle, which is not limited to a position on the front bumper; the rear camera is disposed on the rear part of the vehicle, which is not limited to a position on the rear bumper; the left camera is disposed on the left side of the vehicle, which is not limited to a position on the left rear-view mirror; the right camera is disposed on the right side of the vehicle, which is not limited to a position on the right rear-view mirror; and the front, rear, left and right cameras are installed at required heights and provide a required angle of view.

To acquire the panoramic image near the vehicle, the front, rear, left and right cameras may capture images (video/image) in different directions near the vehicle. Then, the images in different directions undergo preprocesses such as noise removal, cutting, splicing, smoothing, and calibration and distortion correction to form an image covering a 360° field of view near the vehicle, that is, the panoramic image. After the panoramic image near the vehicle is acquired, a parking space line can be recognized in the panoramic image to extract all possible parking space lines near the vehicle in the panoramic image. The specific recognition process is implemented by using the existing technology, and is not described in detail herein. Preprocessing the images in different directions can effectively eliminate irrelevant information in the images, restore useful real information, enhance the detectability of relevant information, and simplify data to the greatest extent, thereby improving the reliability of subsequent feature recognition.

S2: Determining whether a parking space exists near the vehicle according to a recognition result.

According to an embodiment of the present disclosure, the determining whether a parking space exists near the vehicle according to a recognition result may include: if a probable parking space line is recognized, and a pixel value of the probable parking space line is greater than or equal to a set pixel value threshold, determining that the parking space exists near the vehicle; or if a probable parking space line is recognized, but a pixel value of the probable parking space line is smaller than a set pixel value threshold, or a probable parking space line is not recognized, determining that no parking space exists near the vehicle. The pixel value threshold can be calibrated according to actual situations.

During recognition of the parking space line in the panoramic image, the parking space line may be or not be recognized, and the recognized parking space line may be a valid parking space line or an invalid parking space line. Therefore, at this point, all recognized possible parking space lines are listed as probable parking space lines, and then whether a parking space exists near the vehicle is determined based on the probable parking space lines. For example, a pixel value of the probable parking space line can be compared with a set pixel value threshold. If the pixel value of the probable parking space line is greater than the set pixel value threshold, it can be preliminarily determined that a parking space exists near the vehicle, and whether the parking space actually exists will be further determined in subsequent steps; if the pixel value of the probable parking space line is smaller than the set pixel value threshold, it can be determined that no parking space exists near the vehicle. In addition, if the probable parking space line is not recognized, it is directly determined that no parking space exists near the vehicle.

For example, whether a parking space exists cannot be determined accurately in the following circumstances: the ambient light intensity is relatively low, or the parking space line is unclear due to heavy rain, heavy snow or even heavy fog, or the contrast between the parking space line and the ground is not high, or there is serious interference in the parking space, or there are a large number of empty parking spaces leading to low efficiency in automatic detection and parking space search, and even failure to find the parking space. If further determination is made at this time, not only the efficiency of automatic parking is low, but also there is a possibility of misjudgment. Therefore, when the probable parking space line is not recognized, it can be directly determined that no parking space exists near the vehicle. If the probable parking space line is recognized and the pixel value of the probable parking space line is smaller than or equal to the pixel value threshold, that is, when the probable parking space line is unclear, the parking space line is directly ignored. At this point, it can be determined that no parking space exists near the vehicle, and the process enters the processing of no parking space, thereby avoiding the process of further recognizing probable parking space lines and reducing the possibility of misjudgment. For the parking space line having a pixel value greater than the pixel value threshold value, that is, the clear parking space line, further determination can be made on the parking space line to determine whether a valid parking space exists near the vehicle, and further processing is made according to a determining result. Specific determination and processing are described in the following.

S3: If the recognition result indicates that no parking space exists near the vehicle, generating a virtual parking space.

S4: Controlling the vehicle to park automatically according to the virtual parking space.

When it is determined that no parking space exists near the vehicle, a user can manually generate a virtual parking space. The virtual parking space includes but is not limited to a parallel parking space, a perpendicular parking space, and an angle parking space. Then, the vehicle is controlled to park automatically according to the virtual parking space. For example, when it is determined that no parking space exists near the vehicle, the panoramic image can be displayed on a display device, and the user can be reminded by text or voice that no parking space exists near the vehicle and that the user needs to manually generate a virtual parking space. At this point, the user can select a preset virtual parking space (for example, a parallel parking space) from the system according to the panoramic image or the actual environment near the vehicle. After the user completes selection, the vehicle can be controlled to park automatically according to the virtual parking space selected by the user. In this way, when it is determined that no parking space exists near the vehicle, a virtual parking space can be manually generated through the control and confirmation of human consciousness, to achieve efficient, flexible, and accurate parking space selection and confirmation. In this way, the automatic parking is implemented in an efficient, flexible, and safe way.

The display module may be an in-vehicle display device or a terminal device, so that when the user is in the vehicle, the user can generate the virtual parking space according to the panoramic image provided on the in-vehicle display device; when the user is near the vehicle or away from the vehicle, the user can generate the virtual parking space according to the panoramic image provided on the terminal device (such as a mobile phone), thereby making parking more flexible, and efficient.

According to an embodiment of the present disclosure, the automatic parking method may further include adjusting the virtual parking space according to an adjustment instruction of the virtual parking space input by the user and controlling the vehicle to park automatically according to the adjusted virtual parking space.

The adjusting the virtual parking space according to an adjustment instruction of the virtual parking space input by the user includes: adjusting a size of the virtual parking space according to a size adjustment instruction of the virtual parking space input by the user; and/or, adjusting an angle of the virtual parking space according to an angle adjustment instruction of the virtual parking space input by the user; and/or, adjusting a position of the virtual parking space according to a position adjustment instruction of the virtual parking space input by the user.

After the user selects the preset virtual parking space (for example, a parallel parking space) from the system, the size, angle (direction) and position of the virtual parking space may not exactly match the actual required parking space, so the user can adjust the virtual parking space at this time. For example, the user can move the virtual parking space according to the panoramic image or the actual environment near the vehicle, and place the virtual parking space at a suitable position. At the same time, the virtual parking space can be adjusted according to the size of the suitable position, or the direction of the virtual parking space (the virtual parking space allows 360° rotation) can also be adjusted according to the direction of the front of the vehicle after parking, to implement efficient and flexible parking at any position and in any direction.

According to an embodiment of the present disclosure, the controlling the vehicle to park automatically according to the adjusted virtual parking space may include: acquiring first actual physical position coordinates of the adjusted virtual parking space on the ground; planning an automatic parking trajectory according to the first actual physical position coordinates; and controlling the vehicle to park automatically along the automatic parking trajectory according to the automatic parking trajectory.

The camera has a certain shooting angle and area, and the area has physical location coordinates on the ground, and the images taken by the camera are in one-to-one correspondence with the physical location coordinates. Therefore, when a virtual parking space is selected in the image, the actual physical position coordinates of the virtual parking space on the ground can be calculated. During automatic parking, the automatic parking trajectory can be planned according to the actual physical position coordinates of the virtual parking space on the ground, and then the vehicle may be controlled to park automatically according to the planned automatic parking trajectory, to ensure that the vehicle can automatically park in the virtual parking space.

For example, after the virtual parking space is generated, system parameters can be calibrated and adjusted through tests to achieve a one-to-one correspondence between the virtual parking space and the actual position of the virtual parking space on the ground. That is, the generated virtual parking space is calibrated and optimized so that the generated virtual parking space is in one-to-one correspondence with the actual position of the virtual parking space on the ground. The test, calibration, and adjustment of the system parameters include, but are not limited to, pixel conversion between the camera and the display device. For example, the image taken by the camera on a selected side of the vehicle may be displayed on the display device, and calibration coordinate points of the image taken by the camera on the selected side of the vehicle are acquired. At the same time, key physical coordinates of the virtual parking space set by the user may be acquired, location coordinate information of the two is substituted into a preset conversion algorithm to calculate the physical position coordinates of corresponding calibration points in respective preset coordinate systems, and deviation of the physical position coordinates obtained through calculation from the physical position coordinates of the corresponding calibration point preset in the respective coordinate system may be calculated to obtain the deviation value of the corresponding camera, and then parameter compensation may be performed on the image taken by the camera until the calibration is controlled within an allowable range. Finally, all images taken by the cameras after parameter compensation may be spliced to acquire the panoramic image near the vehicle with virtual parking spaces that are in one-to-one correspondence with the actual positions of the virtual parking spaces on the ground.

After the calibration and optimization of the virtual parking space, an optimal automatic parking trajectory can be planned according to the detected the surrounding environment information of the virtual parking space, and then a steering control policy of a steering motor is generated. Then, the vehicle parks into the parking space according to the planned automatic parking trajectory by using longitudinal and lateral motion execution modules such as Electronic Stability Program (ESP) and Electric Power Steering (EPS), to implement fast and safe automatic parking.

In the automatic parking method according to the embodiments of the present disclosure, when it is determined that no parking space exists near the vehicle, a virtual parking space can be manually generated through the control and confirmation of human consciousness, and the vehicle can be controlled to park automatically according to the virtual parking space. Therefore, to certain extent, the mobility, flexibility and safety is improved by the human-assisted virtual parking space in the process of the automatic parking, which makes up for the limitations of automatic parking in related technologies, effectively solves the problem of automatic parking failure, and greatly improves the efficiency of automatic parking.

According to an embodiment of the present disclosure, the automatic parking method may further include: extracting a valid parking space line from the probable parking space line according to a preset parking space feature line if a parking space exists near the vehicle; generating a plurality of valid virtual parking spaces according to the valid parking space line, the valid virtual parking spaces being in one-to-one correspondence with real parking spaces corresponding to the valid parking space line, that is, the valid virtual parking spaces are real parking spaces; selecting a target valid virtual parking space from the plurality of valid virtual parking spaces according to a selection instruction from the plurality of valid virtual parking spaces input by the user; and controlling the vehicle to park automatically according to the target valid virtual parking space.

The extracting a valid parking space line from the probable parking space line according to a preset parking space feature line may include: matching the probable parking space line against the preset parking space feature line; and using the probable parking space line matching the preset parking space feature line as the valid parking space line. The preset parking space feature line is configured to indicate an actual parking space, which can be acquired by collecting current commonly used actual parking space lines. The preset parking space feature line can include the length, width, thickness and the like of the actual parking space line, which is not limited herein.

When a clear probable parking space line is detected, the probable parking space line may be further matched against the preset parking space feature line to determine whether the probable parking space line is a valid parking space line (the parking space line is clear and no vehicle parks within the parking space line). If the probable parking space line is a valid parking space line, position coordinates of the valid parking space line may be calibrated in the panoramic image, and then, according to the position coordinates of the valid parking space line, the accurate position coordinates of the parking spaces can be determined and calibrated to generate several valid virtual parking spaces. The valid virtual parking spaces may include parallel parking spaces, perpendicular parking spaces, angle parking spaces, and the like, and through tests and calibration, the system parameters can be adjusted to ensure that the valid virtual parking spaces are in one-to-one correspondence with the actual positions of the virtual parking spaces on the ground.

After several valid virtual parking spaces are generated, the panoramic image with the valid virtual parking spaces can be presented to a user on the display module. In this way, the user can select a suitable parking space as the target valid virtual parking space from the several valid virtual parking spaces according to the panoramic image or the actual environment near the vehicle. Then, the vehicle may be controlled to park automatically according to the target valid virtual parking space, thereby implementing efficient and flexible automatic parking.

According to an embodiment of the present disclosure, the controlling the vehicle to park automatically according to the target valid virtual parking space may include: acquiring second actual physical position coordinates of the target valid virtual parking space on the ground; planning an automatic parking trajectory according to the second actual physical position coordinates; and controlling the vehicle to park automatically along the automatic parking trajectory according to the automatic parking trajectory. For the specific parking process, reference may be made to the foregoing, and description about details of the process will not be repeated detail here.

In this way, when a plurality of valid parking spaces exists near the vehicle, corresponding virtual parking spaces can be generated according to the valid parking spaces. Thus, the user can directly select a parking space from the virtual parking spaces for automatic parking, to implement efficient and flexible automatic parking.

Figure 2:
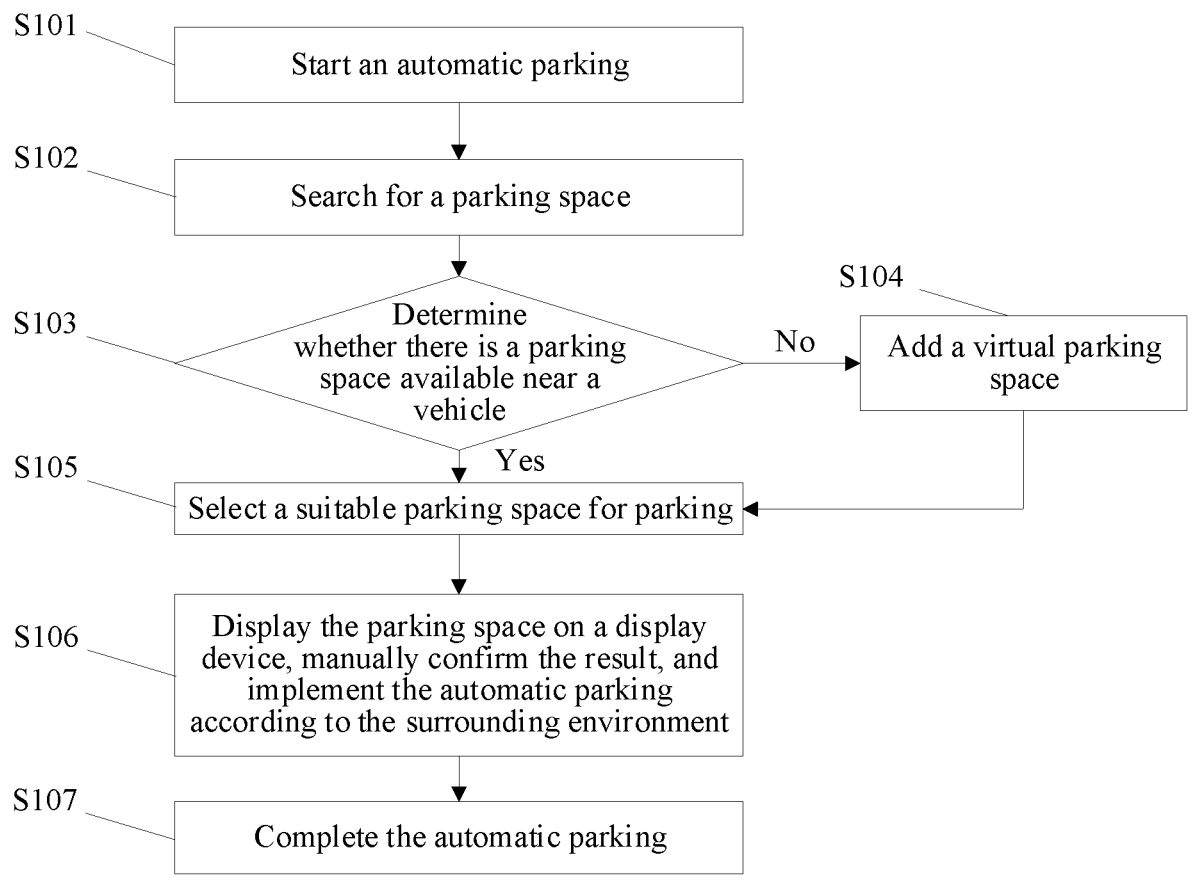
FIG. 2 is another flowchart of the automatic parking method according to an embodiment of the present disclosure.

FIG. 2 is a flowchart of an automatic parking method according to an embodiment of the disclosure. As shown in FIG. 2, the automatic parking method may include the following steps:

S101: Starting an automatic parking.

S102: Searching for a parking space.

S103: Determining whether there is a parking space available near a vehicle; if there is a parking space available near a vehicle, performing S105; if there is no parking space available near the vehicle, performing S104.

S104: Adding a virtual parking space. Adding the virtual parking space includes manually adding a parallel parking space, a perpendicular parking space, or an angle parking space. The virtual parking space can be moved, and the direction thereof allows 360° adjustment.

S105: Selecting a suitable parking space for parking. Selecting the suitable parking space for parking includes a parallel parking space, a perpendicular parking space, or an angle parking space.

S106: Displaying the parking space on a display device, manually confirming the result, and implementing the automatic parking according to the surrounding environment.

S107: Completing the automatic parking.

In the automatic parking method according to the embodiments of the present disclosure, when the system detects a clear parking space line, a plurality of valid virtual parking spaces can be generated. At this point, a user can select a suitable parking space from the plurality of valid virtual parking spaces, and then implement automatic parking according to the parking space. When the parking space line is unclear due to extreme parking environment and extreme weather conditions, or the contrast between the parking space line and the ground is not high, or there is serious interference in the parking space, or there are a large number of empty parking spaces leading to low efficiency in automatic detection and parking space search, and even failure to find the parking space, the system cannot detect the parking space line. Therefore, a user can manually generate a suitable virtual parking space, and then implement automatic parking according to the manual virtual parking space, to implement fast, efficient, and safe parking space confirmation and optimal selection. In this way, the automatic parking is implemented in an efficient, flexible, and safe way.

According to an embodiment of the present disclosure, the automatic parking method may further include: detecting whether there is an obstacle on the automatic parking trajectory; if there is an obstacle on the automatic parking trajectory, controlling the vehicle to slow down and stop, and re-planning the automatic parking trajectory; and controlling, according to the re-planned automatic parking trajectory, the vehicle to park automatically along the re-planned automatic parking trajectory.

In the process of automatic parking, the free space near the vehicle can be detected by using ultrasonic long-range radars, and the obstacles on the automatic parking trajectory can be avoided by using ultrasonic short-range radars. When the ultrasonic short-range radars detect an obstacle on the automatic parking trajectory, the vehicle can slow down and stop by using execution modules such as Electronic Park Brake (EPB), and an optimal automatic parking trajectory can be re-planned according to the new environment until the parking process is completed. In this way, in the process of automatic parking, when an obstacle is detected, an optimal automatic parking trajectory can be re-planned according to the new environment, thereby implementing safe automatic parking.

There may be four ultrasonic long-range radars, two of which are disposed on the front bumper of the vehicle, and the other two are disposed on the rear bumper of the vehicle, and the four ultrasonic long-range radars are all parallel to the longitudinal section of the vehicle body; there may be eight ultrasonic short-range radars, four of which are disposed on the front bumper of the vehicle, and the other four are disposed on the rear bumper of the vehicle. In addition, the ultrasonic long-range radar and the ultrasonic short-range radar are installed at required heights and provide a required angle of view.

In conclusion, in the automatic parking method according to the embodiments of the present disclosure, when automatic parking is required, by sensing the environmental information near the vehicle, a suitable parking space can be manually selected or manually generated through the control and confirmation of human consciousness, to achieve efficient, flexible, and accurate parking space selection and confirmation. In this way, the automatic parking is implemented in an efficient, flexible, and safe way.

Figure 3:
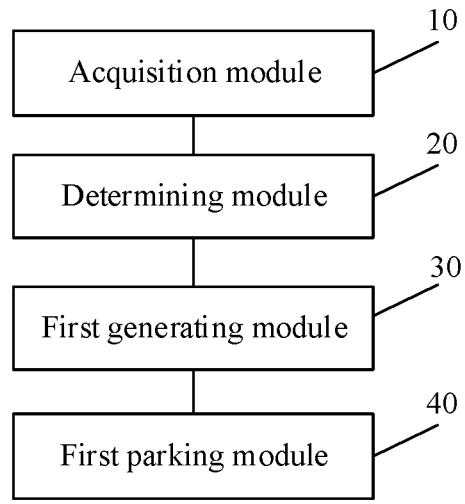
FIG. 3 is a schematic block diagram of an automatic parking device according to an embodiment of the present disclosure.

FIG. 3 is a schematic block diagram of an automatic parking device according to an embodiment of the present disclosure.

As shown in FIG. 3, the automatic parking device according to the embodiments of the present disclosure may include: an acquisition module 10, a determining module 20, a first generating module 30, and a first parking module 40.

The acquisition module 10 is configured to acquire a panoramic image near a vehicle and recognize a parking space line in the panoramic image. The determining module 20 is configured to determine whether a parking space exists near the vehicle according to a recognition result. The first generating module 30 is configured to generate a virtual parking space if no parking space exists near the vehicle. The first parking module 40 is configured to control the vehicle to park automatically according to the virtual parking space.

Figure 4:
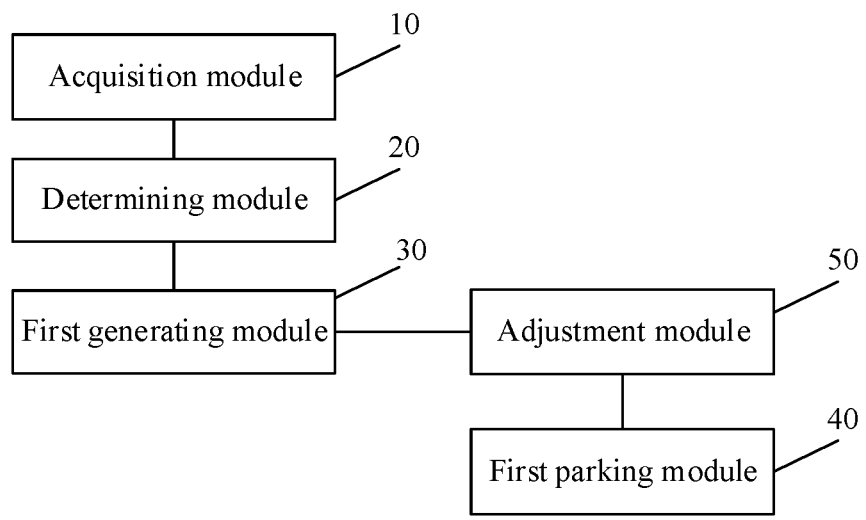
FIG. 4 is another schematic block diagram of the automatic parking device according to an embodiment of the present disclosure.

According to an embodiment of the present disclosure, as shown in FIG. 4, the automatic parking device further includes: an adjustment module 50. The adjustment module 50 is configured to adjust the virtual parking space according to an adjustment instruction of the virtual parking space input by a user, and the first parking module 40 is further configured to control the vehicle to park automatically according to the adjusted virtual parking space.

According to an embodiment of the present disclosure, the first parking module 40 is specifically configured to: acquire first actual physical position coordinates of the adjusted virtual parking space on the ground; plan an automatic parking trajectory according to the first actual physical position coordinates; and control the vehicle to park automatically along the automatic parking trajectory according to the automatic parking trajectory.

According to an embodiment of the present disclosure, the adjustment module 50 is specifically configured to: adjust a size of the virtual parking space according to a size adjustment instruction of the virtual parking space input by the user; and/or, adjust an angle of the virtual parking space according to an angle adjustment instruction of the virtual parking space input by the user; and/or, adjusting a position of the virtual parking space according to a position adjustment instruction of the virtual parking space input by the user.

According to an embodiment of the present disclosure, the determining module 20 is specifically configured to: determine that the parking space exists near the vehicle if a probable parking space line is recognized, and a pixel value of the probable parking space line is greater than or equal to a set pixel value threshold, or determine that no parking space exists near the vehicle if a probable parking space line is recognized, but a pixel value of the probable parking space line is smaller than a set pixel value threshold, or a probable parking space line is not recognized.

Figure 5:
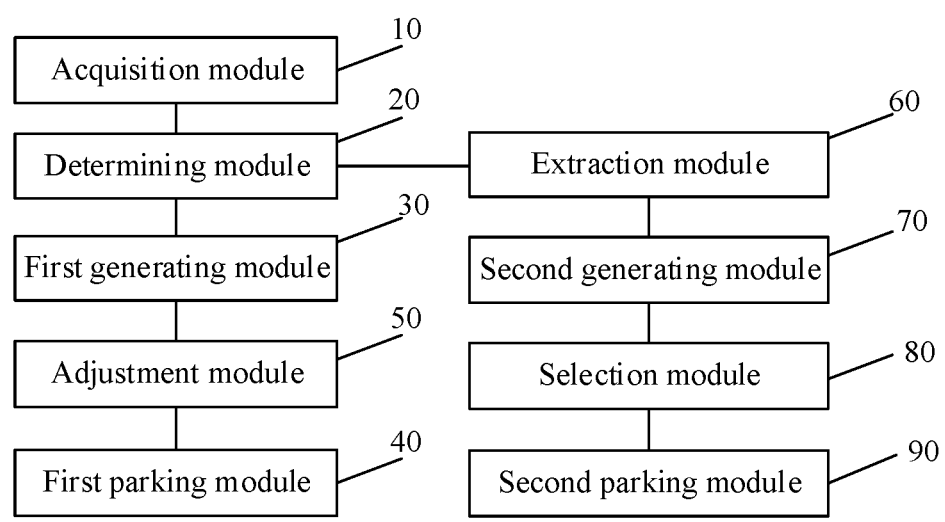
FIG. 5 is a schematic block diagram of the automatic parking device according to another embodiment of the present disclosure.

According to an embodiment of the present disclosure, as shown in FIG. 5, the automatic parking device further includes: an extraction module 60, a second generating module 70, a selection module 80, and a second parking module 90. The extraction module 60 is configured to extract a valid parking space line from the probable parking space line according to a preset parking space feature line if the parking space exists near the vehicle. The second generating module 70 is configured to generate a plurality of valid virtual parking spaces according to the valid parking space line. The valid virtual parking spaces are in one-to-one correspondence with real parking spaces corresponding to the valid parking space line. The selection module 80 is configured to select a target valid virtual parking space from the plurality of valid virtual parking spaces according to a selection instruction from the plurality of valid virtual parking spaces input by the user. The second parking module 90 is configured to control the vehicle to park automatically according to the target valid virtual parking space.

According to an embodiment of the present disclosure, the extraction module 60 is specifically configured to match the probable parking space line against the preset parking space feature line and use the probable parking space line matching the preset parking space feature line as the valid parking space line.

According to an embodiment of the present disclosure, the second parking module 70 is specifically configured to: acquire second actual physical position coordinates of the target valid virtual parking space on the ground; plan an automatic parking trajectory according to the second actual physical position coordinates; and control the vehicle to park automatically along the automatic parking trajectory according to the automatic parking trajectory.

Figure 6:
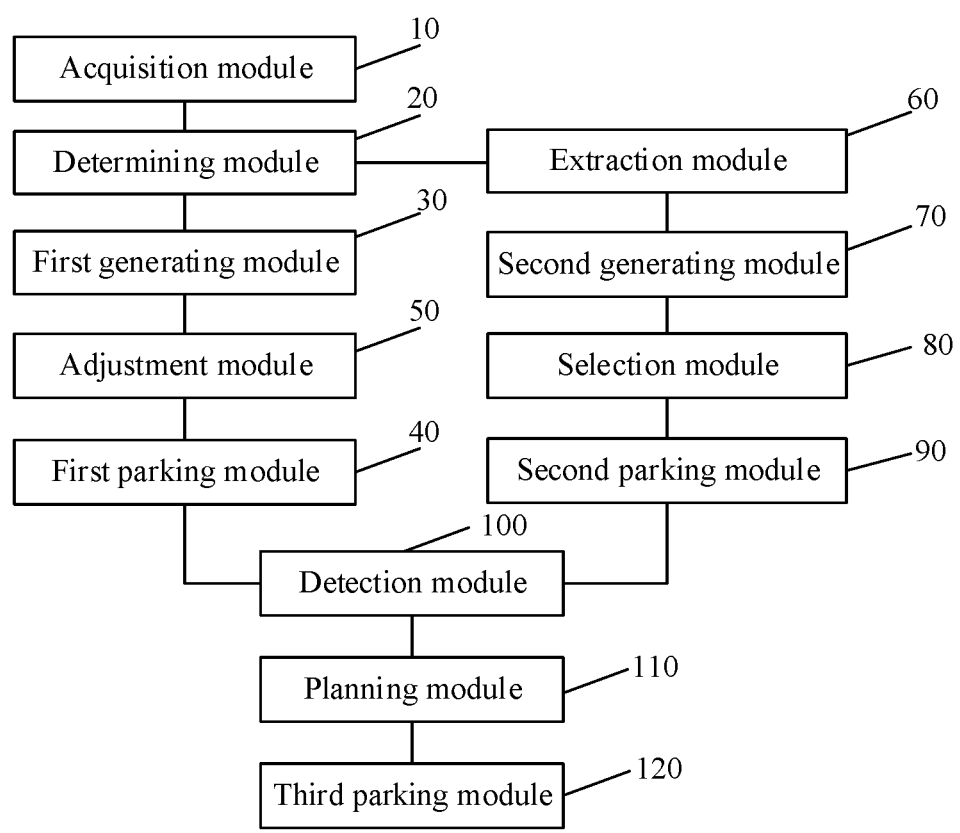
FIG. 6 is a schematic block diagram of the automatic parking device according to still another embodiment of the present disclosure.

According to an embodiment of the present disclosure, as shown in FIG. 6, the automatic parking device further includes: a detection module 100, a planning module 110, and a third parking module 120. The detection module 100 is configured to detect whether there is an obstacle on the automatic parking trajectory. The planning module 110 is configured to control the vehicle to slow down and stop, and re-plan the automatic parking trajectory if there is an obstacle on the automatic parking trajectory. The third parking module 120 is configured to control, according to the re-planned automatic parking trajectory, the vehicle to park automatically along the re-planned automatic parking trajectory.

According to an embodiment of the present disclosure, the acquisition module 10 is specifically configured to acquire a plurality of images in different directions near the vehicle and preprocess the plurality of images to obtain the panoramic image.

According to an embodiment of the present disclosure, the acquisition module 10 is specifically configured to perform any one of or a combination of the following processes on the plurality of images: noise removal, cutting, splicing, smoothing, and calibration and distortion correction.

It should be noted that for details not disclosed in the automatic parking device in the embodiments of the present disclosure, reference should be made to the details disclosed in the automatic parking method in the embodiments of the present disclosure. The description will not be repeated here.

In the automatic parking device according to the embodiments of the present disclosure, the acquisition module acquires a panoramic image near a vehicle and recognizes a parking space line in the panoramic image. The determining module determines whether a parking space exists near the vehicle according to a recognition result. The first generating module generates a virtual parking space if no parking space exists near the vehicle. The first parking module controls the vehicle to park automatically according to the virtual parking space. In this way, a virtual parking space can be generated to assist the vehicle to implement automatic parking when no parking space exists near the vehicle, to implement automatic parking in an efficient, flexible, and safe way.

Figure 7:
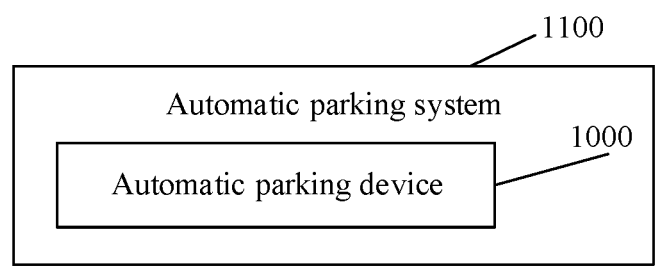
FIG. 7 is a schematic block diagram of an automatic parking system according to an embodiment of the present disclosure.

FIG. 7 is a schematic block diagram of an automatic parking system according to an embodiment of the present disclosure. As shown in FIG. 7, an automatic parking system 1100 according to an embodiment of the present disclosure includes an automatic parking device 1000.

In the automatic parking system according to the embodiments of the present disclosure, the aforementioned automatic parking device is used to generate a virtual parking space to assist a vehicle to implement automatic parking when no parking space exists near the vehicle, to implement automatic parking in an efficient, flexible, and safe way.

Figure 8:
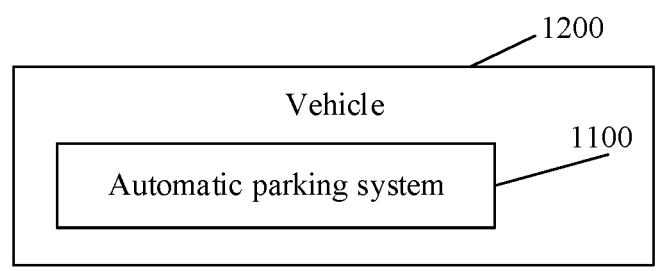
FIG. 8 is a schematic block diagram of a vehicle according to an embodiment of the present disclosure

FIG. 8 is a schematic block diagram of a vehicle according to an embodiment of the present disclosure. As shown in FIG. 8, a vehicle 1200 according to an embodiment of the present disclosure includes the automatic parking system 1100.

In the vehicle according to the embodiments of the present disclosure, the aforementioned automatic parking system is used to generate a virtual parking space to assist a vehicle to implement automatic parking when no parking space exists near the vehicle, to implement automatic parking in an efficient, flexible, and safe way.

It should be understood that, some embodiments of the present disclosure can be implemented by using hardware, software, firmware, or a combination thereof. In the foregoing implementations, a plurality of steps or methods may be implemented by using software or firmware that are stored in a memory and are executed by a proper instruction execution system. For example, if being implemented by hardware, like another implementation, the plurality of steps or methods may be implemented by any one of following common technologies in the art or a combination thereof: a discrete logic circuit of a logic gate circuit for realizing a logic function for a data signal, an application specific integrated circuit (ASIC) having a suitable combined logic gate circuit, a programmable gate array (PGA), and a field programmable gate array (FPGA).

In the description of the present disclosure, it should be understood that, orientations or position relationships indicated by terms such as "center", "longitudinal", "transverse", "length", "width", "thickness", "up", "down", "front", "rear", "left", "right", "vertical", "horizontal", "top", "bottom", "inner", "outer", "clockwise", "counterclockwise", "axial", "radial", and "circumferential" are orientations or position relationships shown based on the accompanying drawings, and are used only for ease of describing the present disclosure and simplifying the description, rather than indicating or implying that the apparatus or element should have a particular orientation or be constructed and operated in a particular orientation, and therefore, should not be construed as a limitation on the present disclosure.

In addition, terms "first" and "second" are used only for description purpose, and shall not be construed as indicating or implying relative importance or implying a quantity of indicated technical features. Therefore, features defined by "first" and "second" may explicitly or implicitly include at least one of the features. In description of the present disclosure, "plurality of" means at least two, such as two and three unless it is specifically defined otherwise.

In the present disclosure, it should be noted that unless otherwise clearly specified and limited, the terms "mounted", "connected", "connection", and "fixed" should be understood in a broad sense. For example, a connection may be a fixed connection, a detachable connection, or an integral connection; or, may be a mechanical connection or an electrical connection; or, may be a direct connection or an indirect connection by means of an intermediate medium; or, may be internal communication between two elements or interaction relationship between two elements, unless otherwise clearly limited. A person of ordinary skill in the art can understand specific meanings of the terms in the present disclosure based on specific situations.

In the present disclosure, unless otherwise explicitly specified or defined, the first feature being located "above" or "below" the second feature may be the first feature being in direct contact with the second feature, or the first feature being in indirect contact with the second feature through an intermediary. Moreover, the first feature "on", "above" and "on the top of" the second feature may be that the first feature is directly above or obliquely above the second feature, or merely that the level of the first feature level is higher than that of the second feature. The first feature being "underneath", "below" or "on the bottom of" a second feature may include that the first feature is underneath or below the second feature or merely indicates that the horizontal height of the first feature is lower than that of the second feature.

In the descriptions of this specification, descriptions such as reference terms "an embodiment", "some embodiments", "example", "specific example", or "some examples" intend to indicate that specific features, structures, materials, or characteristics described with reference to embodiments or examples are included in at least one embodiment or example of the present disclosure. In the specification, schematic descriptions of the foregoing terms do not need to be specific to a same embodiment or example. Furthermore, the particular features, structures, materials, or characteristics described may be combined in a suitable manner in any one or more embodiments or examples. Besides, under the situation of no mutual contradiction, those skilled in the art may combine different embodiments or examples described in this description and the features of different embodiments or examples.

Although the embodiments of the present disclosure have been shown and described above, it can be understood that the foregoing embodiments are exemplary and should not be understood as limitation to the present disclosure. A person of ordinary skill in the art can make changes, modifications, replacements, or variations to the foregoing embodiments within the scope of the disclosure.

What is claimed is:

1. An automatic parking method, comprising:
    acquiring a panoramic image near a vehicle, and recognizing a parking space line in the panoramic image;
    determining whether a parking space exists near the vehicle according to a recognition result;
    in response to determining that no parking space exists near the vehicle, generating a virtual parking space;
    adjusting the virtual parking space according to an adjustment instruction of the virtual parking space input by a user; and
    controlling the vehicle to park automatically according to the adjusted virtual parking space.

2. The automatic parking method according to claim 1, wherein the controlling the vehicle to park automatically according to the adjusted virtual parking space comprises:
    acquiring first actual physical position coordinates of the adjusted virtual parking space on the ground;
    planning an automatic parking trajectory according to the first actual physical position coordinates; and
    controlling the vehicle to park automatically according to the automatic parking trajectory.

3. The automatic parking method according to claim 1, wherein the adjusting the virtual parking space according to an adjustment instruction of the virtual parking space input by a user comprises one or more of:
    adjusting a size of the virtual parking space according to a size adjustment instruction of the virtual parking space input by the user;
    adjusting an angle of the virtual parking space according to an angle adjustment instruction of the virtual parking space input by the user; and
    adjusting a position of the virtual parking space according to a position adjustment instruction of the virtual parking space input by the user.

4. The automatic parking method according to claim 1, wherein the determining whether a parking space exists near the vehicle according to a recognition result comprises:
    in response to a probable parking space line being recognized, and a pixel value of the probable parking space line being greater than or equal to a set pixel value threshold, determining that the parking space exists near the vehicle; or
    in response to a probable parking space line being recognized, but a pixel value of the probable parking space line being smaller than a set pixel value threshold, or a probable parking space line being not recognized, determining that no parking space exists near the vehicle.

5. The automatic parking method according to claim 4, further comprising:
    in response to the parking space existing near the vehicle, extracting a valid parking space line from the probable parking space line according to a preset parking space feature line;
    generating a plurality of valid virtual parking spaces according to the valid parking space line,
        wherein the valid virtual parking spaces are in one-to-one correspondence with real parking spaces corresponding to the valid parking space line;
    selecting a target valid virtual parking space from the plurality of valid virtual parking spaces according to a selection instruction from the plurality of valid virtual parking spaces input by the user; and
    controlling the vehicle to park automatically according to the target valid virtual parking space.

6. The automatic parking method according to claim 5, wherein the extracting the valid parking space line from the probable parking space line according to the preset parking space feature line comprises:
    matching the probable parking space line against the preset parking space feature line; and
    using the probable parking space line that matches the preset parking space feature line as the valid parking space line.

7. The automatic parking method according to claim 5, wherein the controlling the vehicle to park automatically according to the target valid virtual parking space comprises:
    acquiring second actual physical position coordinates of the target valid virtual parking space on the ground;
    planning an automatic parking trajectory according to the second actual physical position coordinates; and
    controlling the vehicle to park automatically according to the automatic parking trajectory.

8. The automatic parking method according to claim 2, further comprising:
    detecting whether there is an obstacle on the automatic parking trajectory;
    in response to an obstacle being on the automatic parking trajectory, controlling the vehicle to slow down and stop, and re-planning the automatic parking trajectory; and controlling, according to the re-planned automatic parking trajectory, the vehicle to park automatically along the re-planned automatic parking trajectory.

9. The automatic parking method according to claim 1, wherein the acquiring the panoramic image near a vehicle comprises:
   acquiring a plurality of images in different directions near the vehicle; and
   preprocessing the plurality of images to obtain the panoramic image,
      wherein the preprocessing the plurality of images comprises:
         performing one or more of: noise removal, cutting, splicing, smoothing, and calibration and distortion correction, on the plurality of images.

10. An automatic parking system, comprises:
   an automatic parking device, comprising:
      an acquisition module configured to acquire a panoramic image near a vehicle and recognize a parking space line in the panoramic image;
      a determining module configured to determine whether a parking space exists near the vehicle according to a recognition result;
      a first generating module configured to: in response to no parking space existing near the vehicle, generate a virtual parking space; and
      a first parking module configured to adjust the virtual parking space according to an adjustment instruction of the virtual parking space input by a user, and control the vehicle to park automatically according to the adjusted virtual parking space.

* * * * *